UNITED STATES PATENT OFFICE.

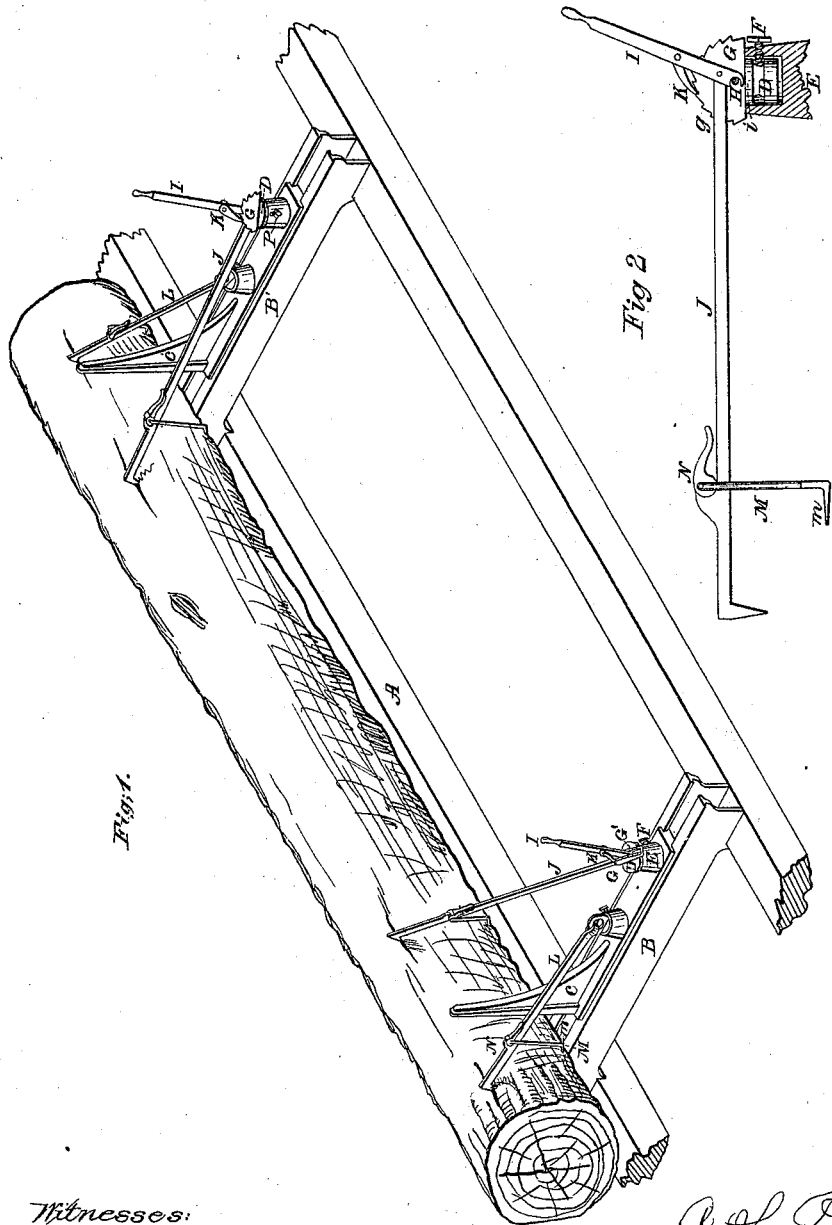

ALGERNON S. PETTICREW, OF DAYTON, ASSIGNOR TO OWENS, LANE, DYER & CO., OF HAMILTON, OHIO.

IMPROVEMENT IN SAW-MILLS.

Specification forming part of Letters Patent No. 43,740, dated August 2, 1864.

*To all whom it may concern:*

Be it known that I, ALGERNON S. PETTICREW, of Dayton, Montgomery county, Ohio, have invented a new and useful Improvement in Dogs for Saw-Mills; and I do hereby declare the following to be a full, clear, and exact description thereof, reference being had to the accompanying drawings, making part of this specification.

The comparatively rapid seasoning of those parts of a log which are most exposed to atmospheric influences places such parts under a high tension, which, having been partially relieved by the separation of a slab, the contractile force remaining on the uncut side acts to spring or camber the timber toward the saw. One practical result of such springing is that the next plank or board separated is thicker in the middle than at its ends. Another result is that the saw blade is pressed out of line, so as to bind and heat in cutting. The last-named defect is well known among sawyers to be the most serious impediment to the use of circular saws for heavy timber.

It is to remedy the above imperfections that the first part of my invention has been designed.

The second part of my invention is intended to prevent the rolling or canting of the log during the operation of sawing.

Figure 1 is a perspective view representing my improved dogs in position. Fig. 2 is a side elevation of my auxiliary dog and its accessories.

A represents a portion of a saw-mill carriage, supporting head-blocks B B', and knees C C', of any approved construction.

My provision for counteracting the spring of the log is constructed as follows: D is a swivel secured in a socket, E, near the rear of the knee, by means of a pin, F. The swivel D has two semicircular cheeks, G G', containing between them a round bar, H, for the engagement of a clawed lever, I $i$, to which there is hinged a dog, J, called by me the "auxiliary dog," which dog is of such length as to extend obliquely to the upper surface of the log in the manner shown. A pawl, K, hinged to the lever I $i$, and engaging on the semicircular edges of the cheeks G G', retains the said lever to any position to which it may be drawn. The cheeks G G' may be armed with ratchet-teeth $g'$ or may be left smooth.

The device D E F G G' H I $i$ J K may be attached to the knee in the manner represented, or to a bar extending from knee to knee or otherwise, and the dog J may be caused to engage either beyond or between the head-blocks, according to whether it be necessary to oppose an outward or an inward spring of the timber.

A modification of the above may consist in providing the lever end of my auxiliary dog with an eyebolt, which, being passed through a flange on the knee, is retracted by means of a nut or a wedge on the rear of the flange.

My device to prevent the rolling of the log may be attached either to the auxiliary dog J or to the ordinary dog, L, or to both of them, and is constructed as follows: M is a hooked rod, which is suspended from the dog J or L by means of a cam-headed lever, N, which occupies a socket in the dog. The hook $m$ of the rod M, being drawn into the under side of the log by means of the lever N, acts in concert with the hook of the dog proper to prevent or oppose any tendency of the log to roll on its bearings.

The device M $m$ N, I style the "counter-dog."

I claim herein as new and of my invention—

1. The auxiliary dog J, with its accessories D E F G G' H I $i$ K, or their equivalents, for counteracting the spring of the log in the manner described.

2. The provision of the counter-dog M $m$ N, for the prevention of canting or rolling, as set forth.

In testimony of which invention I hereunto set my hand.

ALGERNON S. PETTICREW.

Witnesses:
GEO. H. KNIGHT,
EZRA POTTER.